United States Patent
Kohli et al.

(10) Patent No.: US 8,773,689 B2
(45) Date of Patent: Jul. 8, 2014

(54) RESUBMISSION TO ALTERNATE PRINTERS TO HELP EFFICIENT PRINTING AND SPACE PLANNING

(75) Inventors: Harpreet S. Kohli, Penfield, NY (US); Matthew J. Lombardo, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 520 days.

(21) Appl. No.: 12/500,643

(22) Filed: Jul. 10, 2009

(65) Prior Publication Data

US 2009/0273808 A1 Nov. 5, 2009

Related U.S. Application Data

(63) Continuation-in-part of application No. 12/102,102, filed on Apr. 14, 2008, now Pat. No. 8,559,033.

(51) Int. Cl.
*G06F 3/12* (2006.01)

(52) U.S. Cl.
USPC ............... 358/1.15; 358/1.14; 399/8; 399/9; 399/10; 399/19

(58) Field of Classification Search
CPC ..... G06F 3/1211; G06F 3/126; G06F 3/1253; G06F 3/1261; G06F 3/1291; G03G 15/5075; G03G 15/5016; G03G 2215/00113; G06K 15/1809; G06Q 30/0283; G06Q 30/0291; G06Q 30/0269
USPC ............................. 358/1.1, 1.14, 1.15; 710/15
See application file for complete search history.

(56) References Cited

U.S. PATENT DOCUMENTS

| | | | |
|---|---|---|---|
| 6,032,004 A | 2/2000 | Mirabella, Jr. et al. | |
| 6,452,692 B1 * | 9/2002 | Yacoub | 358/1.15 |
| 6,529,286 B1 | 3/2003 | King | |
| 6,552,813 B2 * | 4/2003 | Yacoub | 358/1.15 |
| 8,134,724 B2 | 3/2012 | Kephart et al. | |

(Continued)

FOREIGN PATENT DOCUMENTS

WO    WO 01/29648    4/2001

OTHER PUBLICATIONS

U.S. Appl. No. 12/102,102, Office Action Communication Dated Nov. 1, 2011, pp. 1-21.

(Continued)

*Primary Examiner* — Benny Q Tieu
*Assistant Examiner* — Juan M Guillermety
(74) *Attorney, Agent, or Firm* — Gibb & Riley, LLC

(57) ABSTRACT

A method starts when a print job is received from a workstation. The print job includes user printing options and an identification of an initial printer. The method ranks the abilities of the available printers to process the print job to identify the best printer for the print job according to, among other items, printer proximity. If the initial printer identification creates a print policy violation, the method presents a question/statement to the workstation (to the user through the workstation) regarding whether the print job should be redirected to the best printer and provides an automated resubmit option at the workstation. If the resubmit option is activated, the method automatically submits the print job to a different available printer, without requiring the user to manually input the printing options.

16 Claims, 8 Drawing Sheets

(56) References Cited

U.S. PATENT DOCUMENTS

| | | |
|---|---|---|
| 2003/0090697 A1 | 5/2003 | Lester et al. |
| 2005/0030574 A1 | 2/2005 | McVey et al. |
| 2005/0102442 A1 | 5/2005 | Ferlitsch |
| 2005/0141013 A1 | 6/2005 | Kikuchi et al. |
| 2005/0190383 A1 | 9/2005 | Levin et al. |
| 2005/0275852 A1 | 12/2005 | Ferlitsch |
| 2006/0132826 A1 | 6/2006 | Ciriza et al. |
| 2008/0243379 A1* | 10/2008 | Pearce .................... 701/207 |
| 2008/0263071 A1 | 10/2008 | Ferlitsch et al. |

OTHER PUBLICATIONS

U.S. Appl. No. 12/102,102, filed Apr. 14, 2008, Office Action Communication, Feb. 29, 2012, 19 pages.
Kohli et al., U.S. Appl. No. 12/102,102, Office Action Communication dated Feb. 8, 2013, 36 pages.
Kohli et al., U.S. Appl. No. 12/102,102, Office Action Communication dated Aug. 15, 2012, 29 pages.
Kohli et al., U.S. Appl. No. 12/102,102, Notice of Allowance Communication dated Jul. 9, 2013, 14 pages.

* cited by examiner

| DEVICE | DUPLEX | COLOR CAPABLE | PER PAGE COST | STATUS |
|---|---|---|---|---|
| DEVICE-1 | YES | YES | $0.10 | READY |
| DEVICE-2 | YES | YES | $0.08 | READY |
| DEVICE-3 | YES | NO | $0.05 | READY |
| DEVICE-4 | YES | YES | $0.08 | READY |

Print Job Confirmation

── Print Job Confirmation ──

⚠ Are you sure you want to print to this device as it is slow and large jobs will take a long time to complete?

── Print Job Details ──

Document    Timesheet.xls              Impressions  20
Printer     Xerox WorkCenter 238       Color        Yes
Price       $ 20.45                    Sides        1-Sided ── Recommended Alternatives ──

| Printer | Print Server | Model | Status | Price △ | Location |
|---|---|---|---|---|---|
| 🔍 WC Pro C3545 | sdi.xerox.com | Xerox WC Pro C3545 | Ready | $10.45 | USA / NY / Webster / 111 / 1 / K8 |
| 🔍 Phaser 1235 | mc.xerox.com | Xerox Phaser 135 | Out of Ink | $15.56 | USA / NY / Webster / 111 / 1 / N8 |
| 🔍 WC Pro 90 | web.xerox.com | Xerox WC Pro 90 | Ready | $22.45 | USA / NY / Webster / 111 / 1 / N8 |
| 🔍 - | - | Xerox Phaser 1235 | Ready | $22.45 | USA / NY / Webster / 111 / 1 / N8 |

[OK]  [Cancel]

Print Job Confirmation

Recommended printers

○ My Installed Printers (Queues Already installed)
⦿ Printers Available to Install (Queues on the Managed Print Servers)
○ Other Printers (No Queues on the Managed Print Servers)

Print Job

| Document | Timesheet.xls |
| Printer | Xerox WorkCenter 238 |
| Submitted | 4/31/2007 1:55PM |
| Price | $ 20.45 |

[Details]

The following printers are recommended for this job.
If you want to use any of these printers then "Add" the printer and print our document again.

| | | Printer | Printer Server | Model | Status | Price △ | Location |
|---|---|---|---|---|---|---|---|
| View | Add | WC Pro C35 | sdi.xerox.com | Xerox WC Pro C3545 | Ready | $10.45 | USA / NY / Webster / 111 |
| View | Add | Phaser 1235 | sdi.xerox.com | Xerox Phaser 1235 | Out of Ink | $15.56 | USA / NY / Webster / 111 |
| View | Add | Phaser 1235 | mc.xerox.com | Xerox Phaser 1235 | Out of Ink | $15.56 | USA / NY / Webster / 111 |
| View | Add | Phaser 555 | mc.xerox.com | Xerox Phaser 1235 | Ready | $22.45 | USA / NY / Webster / 111 |

RESUBMISSION TO ALTERNATE PRINTERS TO HELP EFFICIENT PRINTING AND SPACE PLANNING

CROSS-REFERENCE TO RELATED APPLICATIONS

This application is a continuation-in-part of application Ser. No. 12/102,102 filed on Apr. 14, 2008 now U.S. Pat. No. 8,559,033 by Harpreet Kohli et al, and assigned to the same Assignee. The complete disclosure of this application is incorporated herein by reference.

BACKGROUND

1. Field of the Invention

Embodiments herein generally relate to multiple printers systems, and more particularly to a method, service, and computer program product, that provides feedback to the user regarding printers that may be better than the printer selected by the user.

2. Description of Related Art

With the ability to utilize multiple printers through various print servers, management of print jobs through such systems is gaining importance. For example, with respect to automated systems that balance printing loads within a network multi-printer system, European Patent Number 1,224,529, also assigned International Publication Number WO 01/29648, (the complete disclosure of which is incorporated herein by reference) discloses print load balancing, cluster printing and color, black-and-white page splitting. Such systems automatically route print jobs to the most available printer (without user input or feedback) based on factors such as color, black-and-white printing, printing page per minute rates, the number of pages in a job, size and number of copies in a job.

Similarly, U.S. Pat. No. 6,529,286 (the complete disclosure of which is incorporated herein by reference) discloses a dynamically shared printing interface in a computer network that routes print jobs to printers in a user defined preferred printer list based upon a printer's capability to print a certain job when the print job is requested. In this conventional system, a user sends a print job to the dynamically shared printing interface that calculates the estimated workload to print the job designated as a task allocation property, sends a multi-cast to the printers in the preferred printer list requesting printer capability information designated as a printer power index (PPI), receives the printer power index from the printers in the preferred printer list that calculate their own capability, compares the printer power index with the task allocation property, routes the print job whose printer power index best matches with the task allocation property and notifies the user of the printer to which the job is routed. The printers in the preferred printer list calculate their own printer power indexes based upon the printer engine speed, printer memory size, number, size and complexity of print jobs waiting in the printer queue at the instance the multi-cast is received. In another aspect the dynamically shared printing interface re-routes a print job if the original printer develops an error and cannot print the job, by re-sending a multi-cast to the other printers in the preferred printer list requesting printer power indexes, receiving printer power indexes from the printers that re-calculate their printer power index, compare the task allocation property with the resent printer power indexes, re-route the print job whose printer power index best matches the task allocation property and re-notify the user of the printer to which the job is re-routed.

However, such systems provide alternate printers recommendation in a static way by having an administrator set up custom messages to be displayed when defined conditions (also called print policies) are triggered against the submitted print job. Also, such systems consume extensive administration overhead because they need to continuously maintain alternate printer configurations. Other solutions replace operating system (OS) native printing components. The embodiments herein can be leveraged in a manner that provides efficient printing functionality in an intelligent way without the need for replacing standard print components.

SUMMARY

Thus, in an environment where a print control solution is deployed, end-users submitted print jobs may get rejected by the system if they violate administrator defined print policies. The advanced print controls described herein have the capability to recommend alternate printers that can successfully print the same document without violating any policy. It would be disadvantageous to require a user to completely resubmit the document to an alternate printer, because this would require the user to go back to the application used to originate the print job and reselect print options and resubmit the document for printing to the alternate printer. This manual resubmission of the document is time consuming because the document has to go through the print path again and be spooled on the print server before it will be ready to print. Therefore end-users may find manual resubmission of the print document quite unfriendly and not efficient. In view of this, some embodiments herein automate the process of resubmitting the rejected print job to alternate printers.

Also, in many office environments, the locations of some employees work spaces will change from time to time as their allocation to different projects and departments change, as the company changes, or for many other reasons. In addition, the location of printers may change, or printers may be added or removed from the environment as some go out of service or are replaced.

As these changes take place, many users will not maintain their list of print queues. Some users will not be comfortable enough with managing print queues on their system. Some users will not know which queues correspond to the printers that are in their location. Some users may simply prefer to use printers that are located some distance away from their work area.

Over time, all of these changes could result in some users utilizing printers that are not located near their workspace. This is inefficient due to time wasted retrieving printed documents. Normally, the responsibility of trying to keep every user's list of installed print queues up to date falls to system administrators. This effort consumes the time of system administrators. Therefore, embodiments herein provide an automated system for encouraging users to utilize printers that are located nearest to them, which drives printer usage towards greater efficiency without consuming the time of system administrators.

There are solutions available in industry that support automatic job resubmission (also called job routing) of print jobs when a print policy is violated, but these solutions either work only for statically configured printers to which that job can be resubmitted, or they incorrectly assume all available printers are compatible, and thus the same print job stream can be sometimes incorrectly routed to any printer irrespective of the printer model. To the contrary, the embodiments herein support job resubmission features on printers that are recommended as alternatives to ensure that the alternatively selected printer is compatible with the original printer model to allow the resubmitted print job to be printed successfully.

More specifically, the embodiments herein provide a method that gives feedback to the user regarding printers that may be better or closer than the printer selected by the user. More specifically, one exemplary method herein starts when a print job is received from a workstation (from a user operating a workstation). The print job includes user printing options and an identification of an initial printer. The method ranks the abilities of the available printers to process the print job to identify the best printer for the print job.

If the initial printer identification creates a print policy violation, the method presents a question to the workstation (to the user through the workstation) regarding whether the print job should be redirected to the best printer, and provides a resubmit option at the workstation. Depending upon user rights, the question can require the workstation to redirect the print job to the best printer. Thus, embodiments herein recommend the alternate printers that are considered to be efficient, closer, or more appropriate for the end-user. If the end-user decides to send the same job to one of the alternate printers, then the user can use the embodiments herein to automatically resubmit the job to the alternate printer. If the initial printer is ranked as the best printer, the method can optionally simply allow the print job to be processed by the best printer without presenting any questions to the user through the workstation.

The ranking of the available printers is based on each of the printer's characteristics including cost per print, specific printer utilization rate, specific printer capability, printer availability, printer physical proximity to the workstation, and user rights to each printer. When presenting the question, the method can also supply to the workstation information regarding ranking characteristics used to determine which printer is the best printer. Similarly, when presenting the question, the method can provide the workstation with a plurality of alternate printers to choose from, and such alternate printers can be ranked according to the previously established ranking from best to worst.

In addition, the embodiments herein also include systems. For example, one exemplary system embodiment comprises a print server operatively connected to a workstation. Again, the workstation generates the print job and supplies the job to the print server. Many available printers are operatively connected to the print server and the print job includes user printing options and an identification of one of the available printers as the initial printer. A policy server is also operatively connected to the print server. The policy server determines print policy violations and ranks abilities of the available printers to process the print job to identify the best printer for the print job.

If the initial printer identification creates a print policy violation, the print server presents a question on the workstation regarding whether the print job should be redirected to the best printer and provides a resubmit option at the workstation. If the resubmit option is activated, the embodiments herein automatically submit the print job to one of the different available printers, without requiring the user to manually go back through the originating application. This avoids having the user re-input the user printing options to the different printer. Thus, the print server recommends the alternate printers that are considered to be efficient, closer, or more appropriate for the end-user and provides the user with an automated resubmission option. If the initial printer is ranked as the best printer, the print server can optionally allow the print job to be processed by the best printer, without presenting any questions to the user through the workstation.

The policy server ranks the available printers based on printer characteristics including cost, printer utilization rate, printer capability, printer availability, printer proximity, and user rights to a printer. For example, the embodiments herein determine a physical location of the user and the ranking is based on the physical printer proximity to the user (the physically closest printer will have the highest rank). When presenting the question, the print server can supply to the workstation information regarding ranking characteristics used to determine which printer is the best printer. Similarly, when presenting the question, the print server can supply, to the workstation, a plurality of alternate printers that are ranked according to the ranking, from best to worst.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 4 is a schematic diagram of a graphic user interface screenshot according to embodiments herein;

FIG. 9 is a schematic diagram of a graphic user interface screenshot according to embodiments herein.

DETAILED DESCRIPTION

Figure 1:
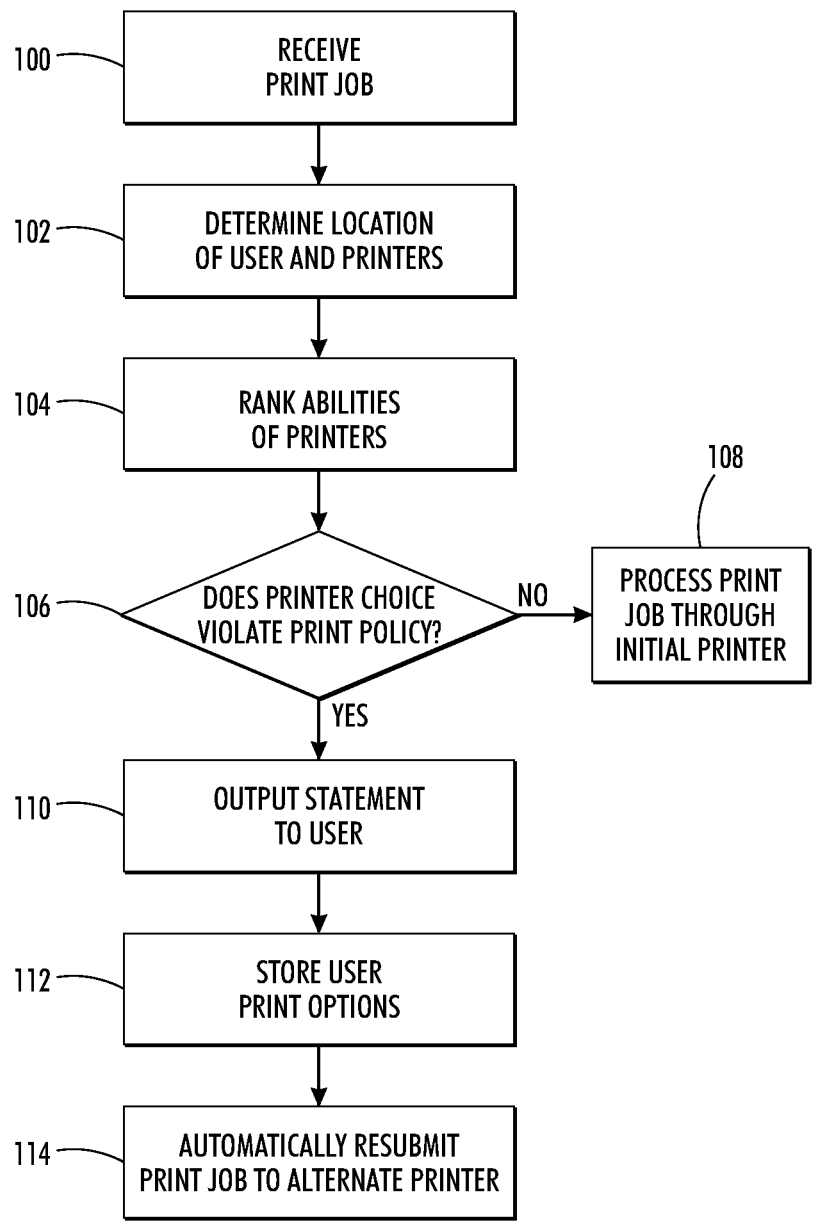
FIG. 1 is a flow diagram illustrating an embodiment herein.

As mentioned above, with embodiments herein suitable alternate printers are recommended to the user if the user has selected a printer that violates a print policy. One exemplary method embodiment herein that provides feedback to the user regarding printers that may be better than the printer selected by the user is shown in flowchart form and FIG. 1. More specifically, in item 100 in FIG. 1, the method starts when a print job is received from a workstation (from a user operating a computerized application on a workstation). The print job includes user printing options (such as the number of copies, whether the copy should be collated, whether duplex printing should be utilized, whether the document should be printed in color, what range of pages should be printed, the orientation for the printing, etc.) and an identification of an initial printer. In item 102, the process determines the location of the user and the locations of the various printers that are available. In item 104, the method ranks the abilities of the available printers to process the print job to identify the best printer for the print job.

Decision box 106 determines whether the initial printer choice made by the user violates any print policy and can optionally determine whether the initial printer selected by the user is actually the best printer (according to the ranking). For example, a print policy can regulate user's rights to use a specific printer (or group or class of printer) and can regulate a user's rights to certain printing functions. If there is no print policy violation (or optionally if the initial printer is ranked as the best printer), the method simply allows the print job to be processed by the initial printer in item 108, without presenting any questions to the user through the workstation.

However, if the initial printer identification creates a print policy violation, in item 110 the method outputs at least one question or statement to the workstation (to the user through the workstation) regarding whether the print job should be redirected to the best printer (depending upon user rights, the question can require the workstation to redirect the print job to the best printer). The method also provides a resubmit option at the WorkStation in item 110. Thus, embodiments herein recommend the alternate printers that are considered to be efficient for the user or more appropriate for the end-user.

In preparation for the automated re-submission of the print job, in item 112, the method stores the user print options. Then, in item 114, the method can automatically resubmit the print job to an alternate printer without requiring the user to resubmit the user print options. Thus, if the end-user decides to send the same job to one of the alternate printers, the resubmit option will be activated by the user, and the embodiments herein will automatically submit the print job to a different available printer, without requiring the user to manually re-input the printing options to the originating software application.

Thus, with embodiments herein suitable alternate printers recommended to the end-user in the print job can be automatically resubmitted to alternate printers. Such a recommendation can be provided either as a confirmation (so that user still has a choice and can ignore the recommendation and continue printing at the originally selected printer) or as an enforcement by cancelling the user's print job and requiring the user to re-submit the print document to an alternate recommended printer.

The ranking 104 of the available printers is based on each of the printer's characteristics including cost per print, specific printer utilization rate, specific printer capability, printer availability, printer physical proximity to the workstation, and user rights to each printer. When presenting the questions/statements 110, the method can also supply to the workstation information regarding ranking characteristics used to determine which printer is the best printer. Similarly, when presenting the questions/statements 110, the method can provide the workstation with a plurality of alternate printers to choose from, and such alternate printers can be ranked according to the previously established ranking from best to worst. For example, the embodiments herein determine the physical location of the user (from item 102) and the ranking is based on the physical printer proximity to the user (the physically closest printer will have the highest rank).

Figures 2, 3:
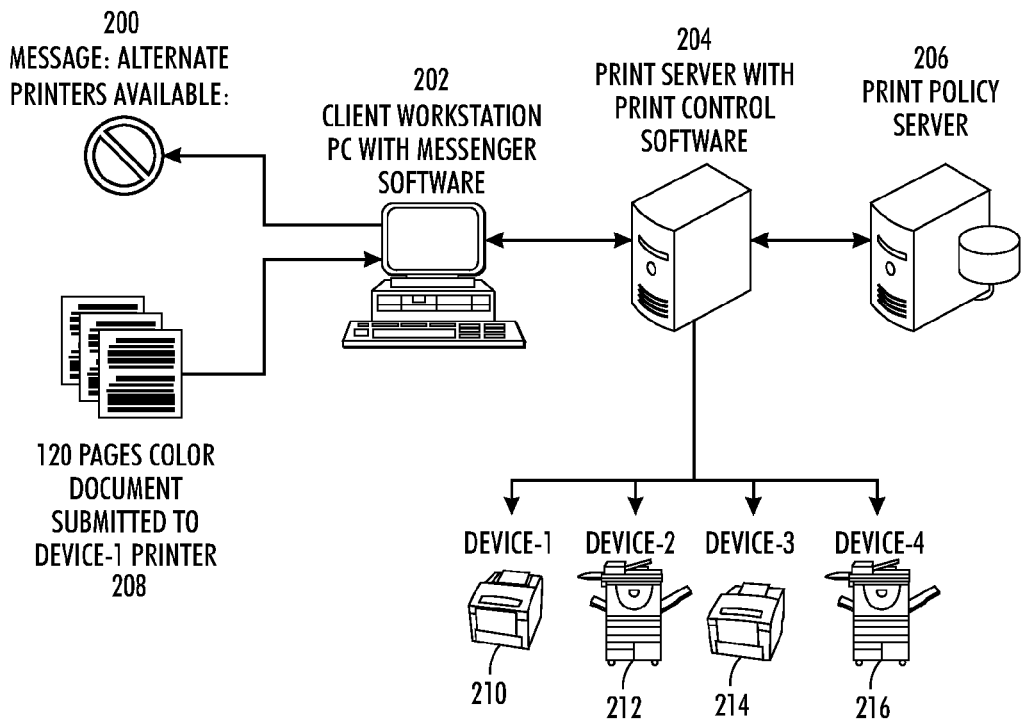
FIG. 2 is a schematic representation of a system according to embodiments herein.
FIG. 3 is a table of printer features according to embodiments herein.

In addition, as shown in FIG. 2, the embodiments herein also include systems that use computerized devices. For example, one exemplary system embodiment comprises a print server 204 operatively connected to a workstation 202. Again, the workstation 202 generates the print job 208 and supplies the job 208 to the print server 204. Many available printers 210, 212, 214, 216 are operatively connected to the print server 204 and the print job 208 includes user printing options and an identification of one of the available printers 210, 212, 214, 216 as the initial printer. A policy server 206 is also operatively connected to the print server 204. The policy server 206 identifies print policy violations and ranks abilities of the available printers 210, 212, 214, 216 to process the print job 208 to identify the best printer for the print job 208.

If the initial printer identification creates a print policy violation, the print server 204 outputs a statement or question 200 on the workstation 202 regarding whether the print job should be redirected 208 to the best printer and provides a resubmit option at the workstation. If the initial printer is ranked as the best printer, the print server 204 allows the print job 208 to be processed by the best printer, without outputting any statements/questions to the user through the workstation 202.

Thus, every time a job is submitted by a print user, the policy server 206 performs a computation based on defined policies to deduce if the target printer is the most appropriate and if not, what other alternate printers can be more efficient and appropriate. The user can then either be given a recommendation dialog or forced to print to one of the alternate printers.

The policy server 206 ranks the available printers 210, 212, 214, 216 based on printer characteristics including cost, printer utilization rate, printer capability, printer availability, printer proximity, and user rights to a printer. When presenting the question, the print server 204 can supply to the workstation 202 information regarding ranking characteristics used to determine which printer is the best printer. Similarly, when presenting the question, the print server 204 can supply, to the workstation 202, a plurality of alternate printers 210, 212, 214, 216 that are ranked according to the ranking, from best to worst. For example, the embodiments herein determine a physical location of the user and the ranking is based on the physical printer proximity to the user (the physically closest printer will have the highest rank).

In specific embodiments, print control software can be installed on the print servers 204 and/or user workstations 202. Such print control software is responsible to intercept the print job and calculate that initial target printer and other available printers in the network, which printers may be more appropriate and best suited for the print job. Similarly, message software that can submit print jobs can be installed on the workstation 202 or print server 204. This message software is responsible to receive messaging requests from the print control software and thus show the appropriate message to the user who submitted print job.

In addition, device and policy manager software can be installed on the policy server 206, which can be a dedicated server machine managed by the administrator. The device and policy manager software is responsible mainly for two items. First, the device and policy manager software can discover print devices and be aware of device capabilities such as; color abilities, speed, duplex abilities etc, dynamic properties such as printer utilization rate, and custom properties such as device location, per page print cost etc. and device status. Secondly, the device and policy manager software can manage user print policies. For example, some policies can allow a certain user to print color, require all users to print only duplex, etc. Device print policies can require that a certain device shall not print black and white print jobs or can restrict a certain device to print jobs only during certain periods of time (8:00 am-5:00 pm) etc.

FIG. 3 is a table which indicates some capabilities, cost, and status of the printers 210, 212, 214, 216 shown in FIG. 2. This information can be used by the policy server 206 to rank the printers with respect to the print job 208. The information included within this table is merely one example of the type of information that can be utilized by the policy server 206 to perform the ranking process. One ordinarily skilled in the art would understand that many other sources of information can be used to rank the different printers and that different features of different printers can be weighted differently in the ranking process.

Figure 5:
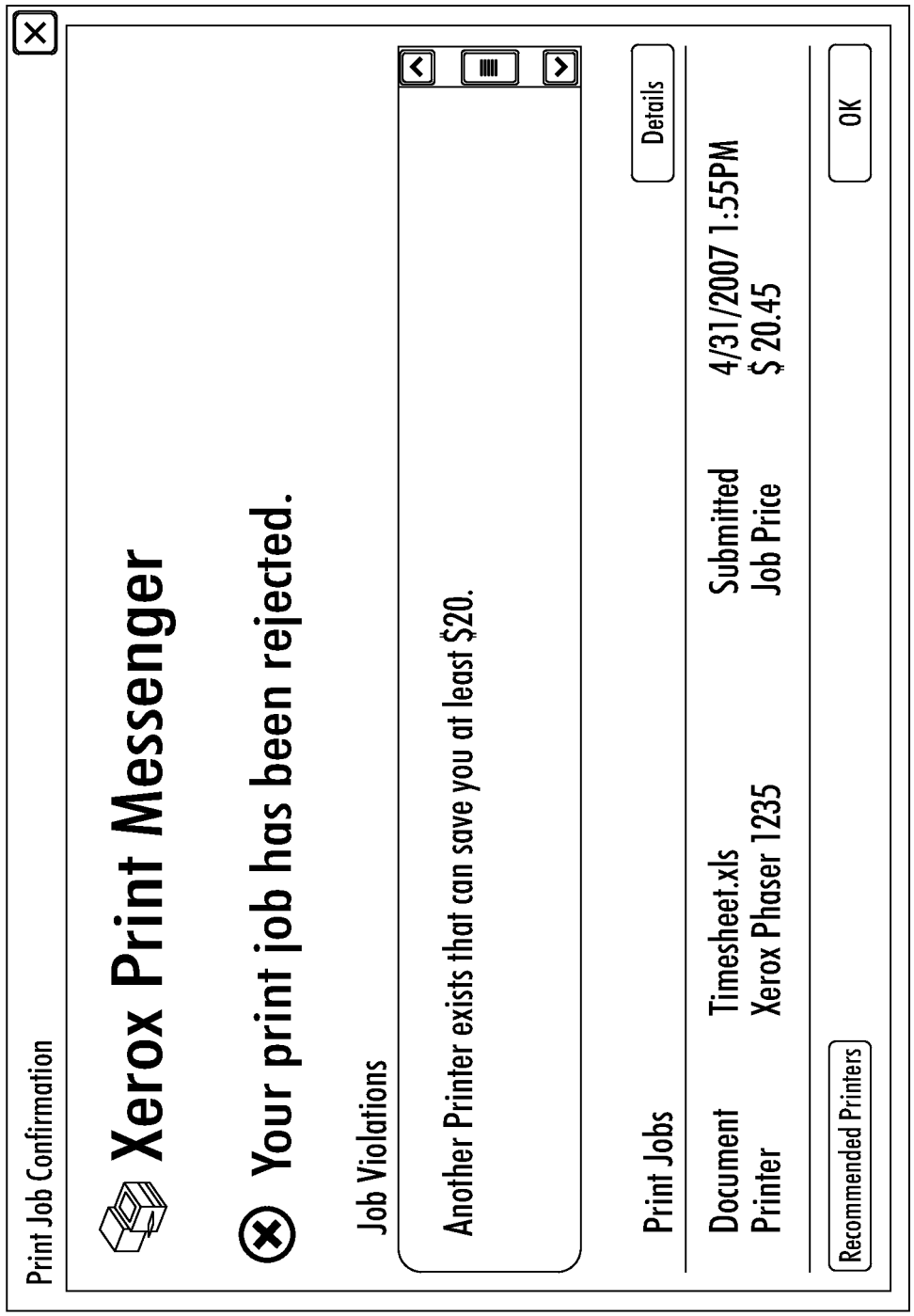
FIG. 5 is a schematic diagram of a graphic user interface screenshot according to embodiments herein.
Figure 6:
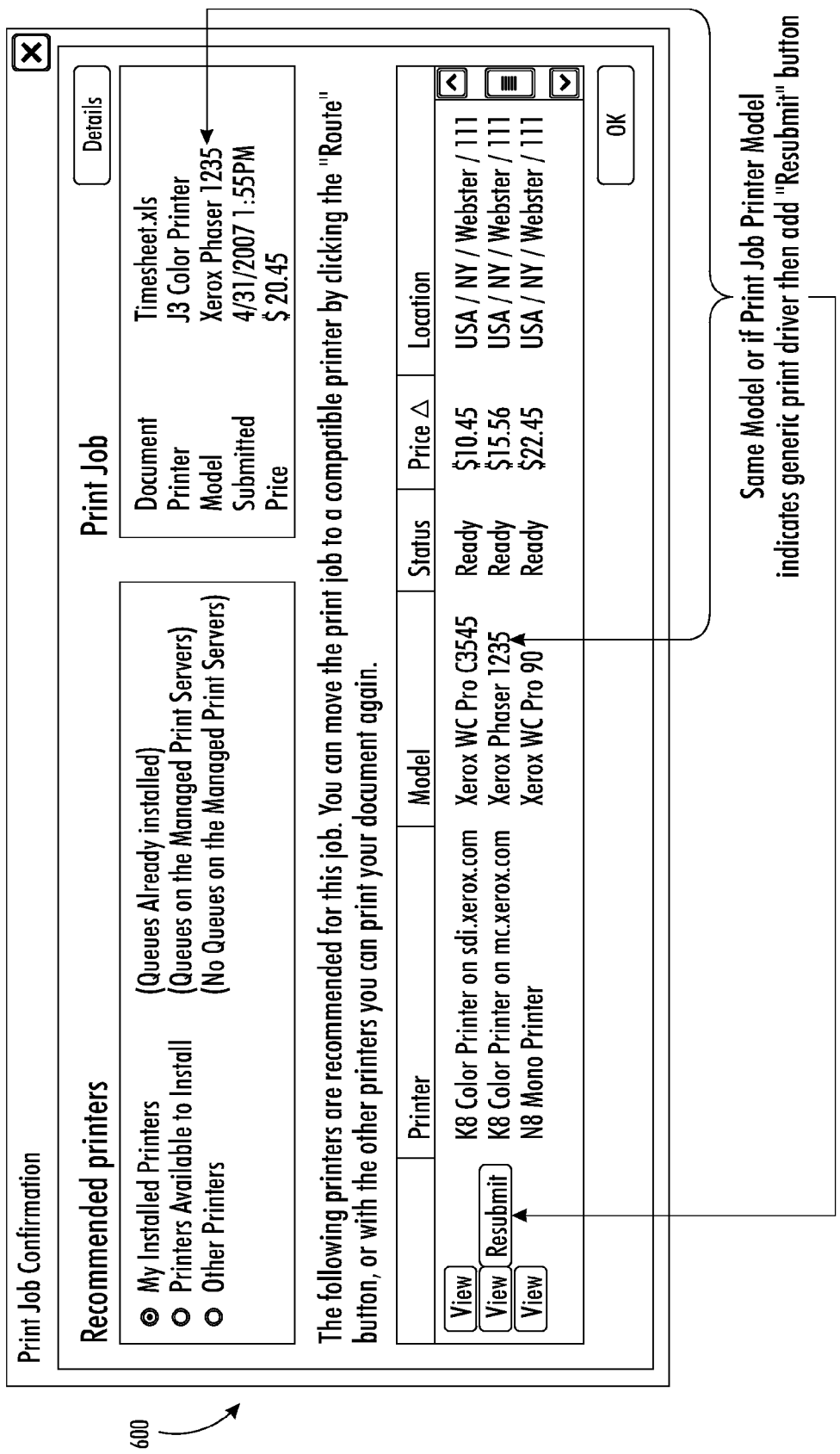
FIG. 6 is a schematic diagram of a graphic user interface screenshot according to embodiments herein.

Further, FIGS. 4-6 illustrate exemplary screen shots 400-600 of the user interface that can output the questions/statements 200 to the user through the workstation 202. For example, the screenshots illustrated can inform the user information regarding how long each printer will take to print the print job, the relative cost between different printers, etc., and can inform the user whether their print job has been rejected. In, for example, FIG. 6, a "Resubmit" graphic user interface display button is illustrated for an identical printer (model 1235) as the originally selected printer, but one which has a higher ranking due to printer location, price or some other reason. If the user clicks on the "Resubmit" button, the embodiments herein will automatically submit the job to the alternate printer without requiring any additional input from the user.

Thus, when a print policy is violated, the system prepares the recommended alternate printers list. The compatibility of the alternate printers can be determined by matching printer model and/or driver names, thus ensuring that the print stream (PDL) prepared by the driver of the printer where the job was originally submitted will be compatible with the physical printer where the job can be routed. Printers that are found compatible can be shown to the end-user with the job resubmit option enabled (FIG. 6) and thus the end-user can simply automatically route the print job from the recommended printer notification dialog, thus skipping the need to go back and manually resubmit the print job.

A printer is considered to be compatible and thus qualified for job resubmission if, for example, its model name is same as the print job original printer, or the print job original printer model name indicates that the print job was submitted from a generic print driver (also known as universal print driver in the print industry). A universal print driver produces a generic job stream that follows standard PDL conventions, thus it can be ideally printed on any network print device irrespective of manufacturer and printer model.

If the user selects the "Resubmit" option (shown in FIG. 6) to resubmit the print job to an alternate printer, then the print control system 204 receives the request and uses its built-in capability to automatically resubmit the print job to the new target printer. The seamless resubmit integration with the recommended alternate printers feature makes it very convenient for end-user to simply redirect their jobs to another printer without going back to the original application used to originally create the print document. Therefore embodiments herein are very user friendly and efficient and also ensure that the resubmission option is available only if a printer is compatible with an already spooled print job stream, thus the output print job quality will not be compromised.

Figure 7:
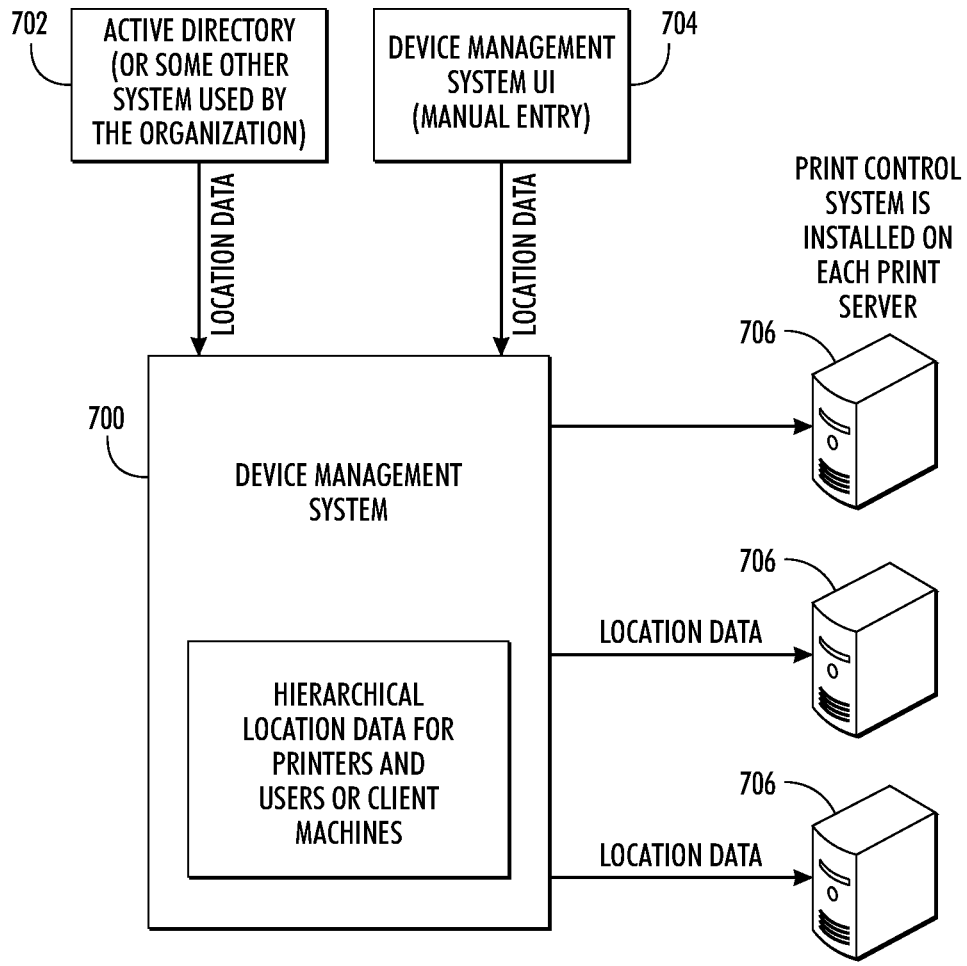
FIG. 7 is a schematic representation of a system according to embodiments herein.
Figure 8:
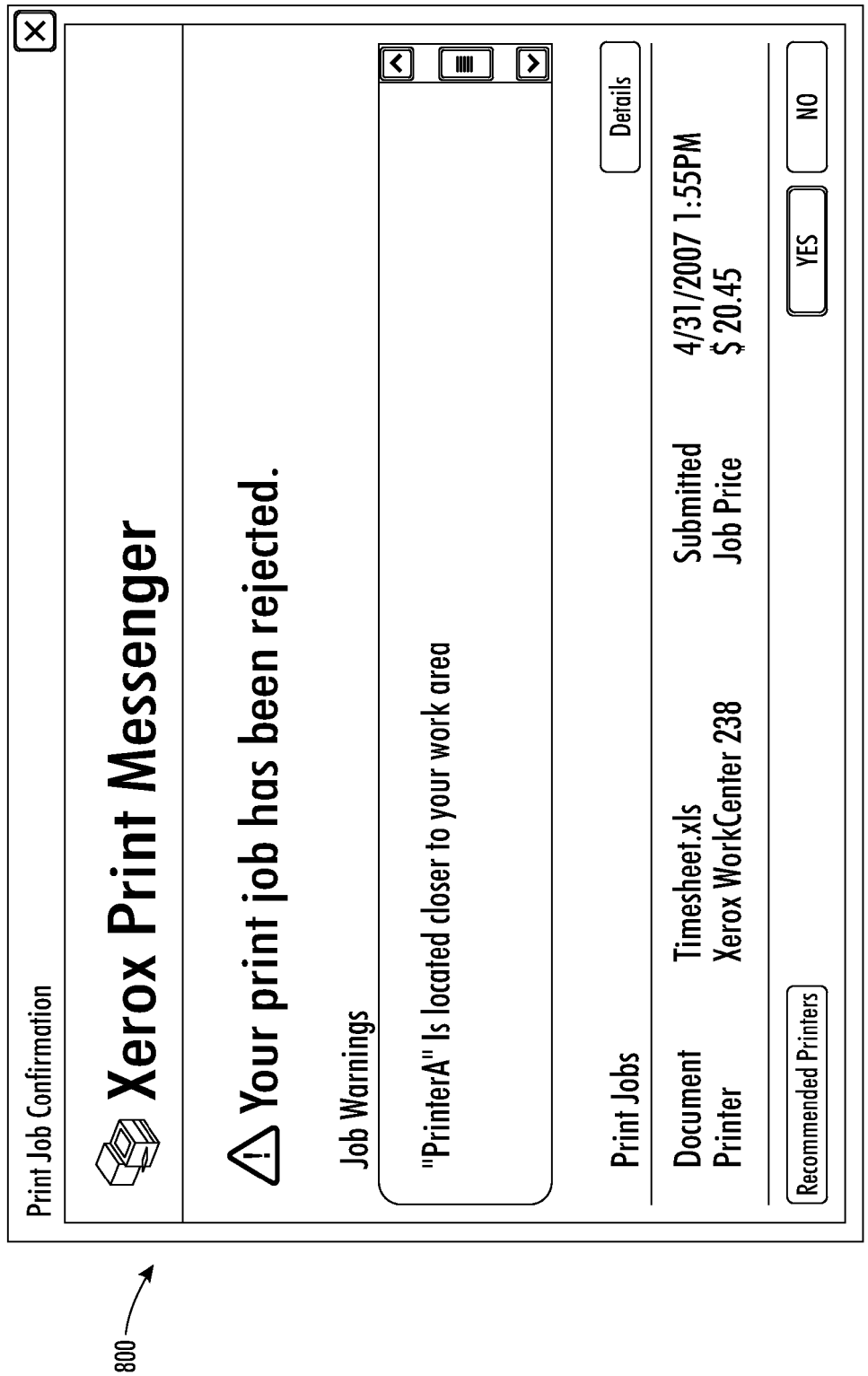
FIG. 8 is a schematic diagram of a graphic user interface screenshot according to embodiments herein.

As shown in FIGS. 7-9, the embodiments herein also leverage hierarchical location data for print devices and user workspaces to help users utilize the print devices that are located nearest to them. The user's location could be determined either by using the location of their workspace (cubicle or office), or by using the location of the client machine that the print job was submitted from.

Encouraging users to utilize the printers that are located nearest to them can be done in three ways: first by informing the user whenever they print a document to some device when they could have used a similar device nearer to them (FIG. 8 illustrates an exemplary screen shot of how this type of non-intrusive message could be displayed). The second method allows the system administrator to add rules to a print control system that prevent users from printing to printers that are not in their location. The third method recommends alternative printers only if they are in a user's immediate location whenever a print job is rejected by the print control system due to a rule violation.

This process uses hierarchical location data for all printers. Hierarchical location data is also used either for user workspaces or client machines. Hierarchical location data contains location information beginning with a very broad category and contain progressively more specific location data providing as much information about the entity's location as is available. An example of the hierarchical location data format would be:

\\Country\State or Province\City\Building\Floor\Work Area

None of these fields would be required, but for every field that is specified, its previous field is also required. So the following location specification is valid:

\\USA\NY\Rochester

However, the following location specification is NOT valid:

\\\\Rochester\Building1111

This exemplary format allows a system to determine relative proximity of two entities (many other formats could be used). The fields are compared from least specific to most specific. Locations which have more fields in common are closer than locations which have fewer fields in common.

This location data can be stored, as shown for example in FIG. 7, in a database and made available by a device management system 700. The location data could be entered into the device management system 700 manually through a device management system user interface 704, or it could be imported from other areas where a company may already be storing this information, such as an active directory 702. This allows the device management system 700 to know the location data of the different print servers 706 because a print control system is installed on each print server.

With the location data for printers and user workspaces or client machines made available on the print servers 706, the print control system that is installed on those print servers 706 is able to make location comparisons. The print control system could be configured to use client machine locations, user workspace locations, or both depending upon what information is available. The print control system is able to carry out at least the following three methods for encouraging users to utilize the printers that are located nearest to them.

First, the print control system can inform the user whenever they print a document to some device and they could have printed that document to another device that is located nearer to them. Each job that is submitted to the print servers is evaluated by the print control system. As part of this evaluation, the print control system will compare the location of the printer being used to the location associated with the submitted job to determine relative proximity. The print job location will then be compared to all other available printers. If any printer is found to be closer, then a message will be sent to the user informing them that they could have used a closer printer. If multiple printers are found that are closer, the user will only be informed about the closest printer. If more than one of the closer printers is the same distance from the user, then the user may either be informed about all such printers, or some other method can be used to determine a preferred printer. The information about the closer printer(s) will be communicated to the user through some non-intrusive method, such as a balloon message or a toaster pop-up. An example message could be: "The print job c:\yourdoc was sent to printerA. This job could have been sent to a printer which is located closer to your work location. Please consider using printerA in the future." This method is non-intrusive and does not impede the user's work. It does not force users to switch to printers which are closer to them, but some users will act on the message and make the switch to the preferred printer, increasing their efficiency.

Secondly, the print control system can enforce policies that prevent users from using printers that are not in their own location. For example, system administrators could create print policies that reject a user's print job or force confirmation of a print job if it is sent to a printer that is not located within some distance proximity threshold. In these cases a message would be displayed on the machine from where the job originated explaining the policy to the user. In the case of a job that requires confirmation, the message could appear as illustrated in FIG. 8. The confirmation and reject message are slightly intrusive, but they are a more proactive way of getting users to utilize the preferred printers, thus increasing efficiency. In the case of rejected jobs, users are forced into making the desired changes.

Thirdly, the print control system can recommend alternative printers that are in the user's immediate location whenever a print job violates any policy being enforced by the print control system. When the print control system determines that a print job requires confirmation or needs to be rejected, the user may request a list of recommended alternative printers to use for that print job. The recommended alternative printers are displayed to the user in a dialog such as that shown in FIG. 9. As shown, the list of recommended alternative printers could be filtered based on location prior to presenting it to the user. Printers that are some threshold of proximity to the user would not be recommended. Using this method drives the environment towards one where all users are using the printers in their immediate area.

One problem that may be faced in implementation is the existence of users or client machines with no known location, such as employees with laptops who are often working from different locations. This problem is overcome by not storing any location data for such users/machines. The system makes no assumptions about location if none is provided. In this way, print jobs sent by users with a changing location will not be affected.

The present embodiments provide a more efficient printing environment and remove some burden of maintaining user print queues from system administrators. The embodiments herein help users adjust to their changing work environment more quickly and with less stress. If an employee is relocated to a different area, and their location data is updated within the system, the embodiments herein automatically start providing information about the printers in the employee's new area. Also, if a printer's location changes or new printers come online, the system can automatically begin to provide information about these changes to the employee in a way that will allow them to make the best choices about which printers to use and allow them to easily resubmit their print jobs to the most appropriate printer.

Various computerized devices such as servers and workstations are mentioned above. Computers that include input/output devices, graphic user interfaces, memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA, and the details of such devices are not discussed herein for purposes of brevity and reader focus.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Norwalk, Conn., USA. Such printers commonly include input/output, power supplies, processors, media movement devices, marking devices etc., the details of which are omitted herefrom to allow the reader to focus on the salient aspects of the embodiments described herein.

Further, as mentioned above, some conventional systems (such as that disclosed in the previously referenced European Patent Number 1,224,529, also assigned International Publication Number WO 01/29648,) split the printing over more than one printer where there are several copies to be made. Subsystems can also split the printing over more than one printer for a single copy. Cluster printing specifies a group of printers from which a print job can be performed. Color/black-and-white page splitting splits a printer job, sending non-color pages to black-and-white printers and sending pages with color, to color printers. Embodiments herein are equally applicable to such print sharing and splitting systems and methods.

With embodiments herein, costs can be saved by ensuring printing of large print jobs on high volume printers and by restricting printer use to selected users to provide control on print job characteristics. The embodiments herein can encourage the users to print to an appropriate printer by giving them informational messages at the time of print submission to allow users to re-rout the jobs to the best (most suitable) printer as they send the print job to the print server. Thus, embodiments herein intelligently find suitable alternate printers based on computation that incorporates a combination of: the cost of the job if printed at the printer; the printer utilization rate (indicating how much it has been printing over a given period of time); printer compatibility against print job characteristics such as color, duplex needed, etc.; printer availability based on its status; printer proximity based on its location; user rights to print at the printer (user right to print color, print large documents) etc.

All foregoing embodiments are specifically applicable to electrostatographic and/or xerographic machines and/or processes as well as to software programs stored on the electronic memory (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A machine implemented method comprising:
receiving a print job from a user into a computerized device, wherein said print job includes user printing options and an identification of an initial printer;

ranking abilities of available printers to process said print job to identify a best printer for said print job using said computerized device;

rejecting said print job after said receiving of said identification of said initial printer from said user, using said computerized device, to cause said print job to be a rejected print job if said identification of said initial printer creates a print policy violation;

if said print job comprises said rejected print job, displaying a statement on a graphic user interface of said computerized device regarding said best printer and providing a resubmit option on said graphic user interface of said computerized device, wherein said displaying of said statement further comprises displaying ranking characteristics used to determine which printer is said best printer on said graphic user interface; and if said resubmit option is activated, automatically submitting said rejected print job to a different printer of said available printers using said computerized device, without requiring said user to manually resubmit said printing options.

2. The method according to claim 1, wherein said ranking is based on printer characteristics including cost, printer utilization rate, printer capability, printer availability, and user rights to a printer.

3. The method according to claim 1, wherein said displaying of said statement comprises providing said computerized device with a plurality of alternate printers ranked according to said ranking.

4. The method according to claim 1, further comprising determining a physical location of said user, wherein said ranking is based on physical printer proximity to said user.

5. A machine implemented method comprising:

receiving a print job from a computerized device, wherein said print job includes user printing options and an identification of an initial printer;

ranking abilities of available printers to process said print job to identify a best printer for said print job using said computerized device;

rejecting said print job after said receiving of said identification of said initial printer from said user, using said computerized device, to cause said print job to be a rejected print job if said identification of said initial printer creates a print policy violation;

if said print job comprises said rejected print job, displaying a statement on a graphic user interface of said computerized device regarding said best printer and providing a resubmit option on said graphic user interface of said computerized device, wherein said displaying of said statement further comprises displaying ranking characteristics used to determine which printer is said best printer on said graphic user interface; and if said resubmit option is activated, automatically submitting said rejected print job to a different printer of said available printers using said computerized device, without requiring said user to manually resubmit said printing options, wherein said displaying of said ranking characteristics on said graphic user interface comprises displaying different costs of processing said print job on said available printers.

6. The method according to claim 5, wherein said ranking is based on printer characteristics including printer utilization rate, printer capability, printer availability, and user rights to a printer.

7. The method according to claim 5, wherein said displaying of said statement comprises providing said computerized device with a plurality of alternate printers ranked according to said ranking.

8. The method according to claim 5, further comprising determining a physical location of said user, wherein said ranking is based on physical printer proximity to said user.

9. A system comprising:

a print server operatively connected to a computerized device, wherein said computerized device comprises a graphic user interface and generates a print job and supplies said print job to said print server;

a plurality of available printers operatively connected to said print server, wherein said print job includes user printing options and an identification of one of said available printers as an initial printer; and a policy server operatively connected to said print server, wherein said policy server ranks abilities of said available printers to process said print job to identify a best printer for said print job;

wherein if said initial printer creates a print policy violation, said print server rejects said print job to cause said print job to be a rejected print job;

wherein if said print job comprises said rejected print job, said print server outputs a statement to said computerized device regarding said best printer and information regarding ranking characteristics used to determine which printer is said best printer, and said graphic user interface provides a resubmit option from said computerized device by displaying said information regarding which printer is said best printer and displaying said ranking characteristics used to determine which printer is said best printer; and if said resubmit option is activated, said print server automatically submits said rejected print job to a different printer of said available printers, without requiring said user to manually resubmit said printing options.

10. The system according to claim 9, wherein said policy server ranks said available printers based on printer characteristics including cost, printer utilization rate, printer capability, printer availability, and user rights to a printer.

11. The system according to claim 9, wherein when outputting said statement said print server supplies, to said computerized device, a plurality of alternate printers ranked according to said ranking.

12. The system according to claim 9, further comprising determining a physical location of said user, wherein said ranking is based on physical printer proximity to said user.

13. A non-transitory computer-usable storage medium storing instructions that, when executed by a computer, cause the computer to perform a method comprising:

receiving a print job from a user into a computerized device, wherein said print job includes user printing options and an identification of an initial printer;

ranking abilities of available printers to process said print job to identify a best printer for said print job using said computerized device;

rejecting said print job after said receiving of said identification of said initial printer from said user, using said computerized device, to cause said print job to be a rejected print job if said identification of said initial printer creates a print policy violation;

if said print job comprises said rejected print job, displaying a statement on a graphic user interface of said computerized device regarding said best printer and providing a resubmit option on said graphic user interface of said computerized device, wherein said displaying of said statement further comprises displaying ranking characteristics used to determine which printer is said best printer on said graphic user interface; and if said resubmit option is activated, automatically submitting said rejected print job to a different printer of said available printers using said computerized device, without requiring said user to manually resubmit said printing options.

14. The non-transitory computer-usable storage medium according to claim 13, wherein said ranking is based on printer characteristics including cost, printer utilization rate, printer capability, printer availability, and user rights to a printer.

15. The non-transitory computer-usable storage medium according to claim 13, wherein said displaying of said statement further comprises providing said computerized device with a plurality of alternate printers ranked according to said ranking.

16. The non-transitory computer-usable storage medium according to claim 13, further comprising determining a physical location of said user, wherein said ranking is based on physical printer proximity to said user.

* * * * *